United States Patent [19]
Weaver, Jr. et al.

[11] Patent Number: 5,903,862
[45] Date of Patent: *May 11, 1999

[54] METHOD AND APPARATUS FOR DETECTION OF TANDEM VOCODING TO MODIFY VOCODER FILTERING

[76] Inventors: Lindsay A. Weaver, Jr., 1162 Cherryvale Rd., Boulder, Colo. 80303; S. Katherine Lam, 9858 Caminito Calor, San Diego, Calif. 92131; William R. Gardner, 4650 Exbury Ct., San Diego, Calif. 92130; Paul E. Jacobs, 9075 La Jolla Shores La., La Jolla, Calif. 92037; Andrew P. DeJaco, 10424 Flanders Cove; Gilbert C. Sih, 10603 Dabney Dr., #8, both of San Diego, Calif. 92126

[*] Notice: This patent issued on a continued prosecution application filed under 37 CFR 1.53(d), and is subject to the twenty year patent term provisions of 35 U.S.C. 154(a)(2).

[21] Appl. No.: 08/575,287

[22] Filed: Jan. 11, 1996

Related U.S. Application Data

[63] Continuation of application No. 08/378,300, Jan. 25, 1995.

[51] Int. Cl.$^6$ .................. G10L 9/18; H04Q 7/24
[52] U.S. Cl. .................. 704/212; 704/221; 704/228; 704/267
[58] Field of Search .................. 395/2.21, 2.3, 395/2.37, 2.39, 2.76; 704/212, 221, 228, 230, 267

[56] References Cited

U.S. PATENT DOCUMENTS

| | | | |
|---|---|---|---|
| 4,782,326 | 11/1988 | Bush | 341/76 |
| 4,802,206 | 1/1989 | Yoshida et al. | 379/158 |
| 5,317,567 | 5/1994 | Champion | 370/267 |
| 5,608,779 | 3/1997 | Lev et al. | 379/88 |

FOREIGN PATENT DOCUMENTS

| | | | |
|---|---|---|---|
| 0605311 | 7/1994 | European Pat. Off. | H04B 7/26 |
| 0664658 | 12/1994 | European Pat. Off. | H04Q 11/04 |
| 9300778 | 6/1992 | WIPO | H04Q 7/04 |
| 9300778 | 1/1993 | WIPO | H04Q 7/04 |
| 9515665 | 6/1995 | WIPO | H04Q 7/24 |
| 9524789 | 9/1995 | WIPO . | |
| 9642176 | 12/1996 | WIPO | H04Q 7/24 |

OTHER PUBLICATIONS

Elis D. Hanson, "Intelligibilty Testing of the Continuous Variable Slope Delta (CVSD) Coder–Decoder (CODEC)", Research and Development Technical Report ECOM–3393, Fort Monmouth, N.J., Feb. 1971, XP000573297.

Elis D. Hanson, "Intelligibility Testing Of The Continuous Variable Slope Delta (CVSD) Coder–Decoder (CODEC)", Research and Development Technical Report ECOM–3393, AD 7721586, XP 000573297, Feb. 1971, 23 pages.

*Primary Examiner*—Allen R. MacDonald
*Assistant Examiner*—Talivaldis Ivars Smits
*Attorney, Agent, or Firm*—Russell B. Miller; Linli L. Golden; Thomas R. Rouse

[57] ABSTRACT

When one vocoding system is coupled to another vocoding system, a tandem arrangement results. The tandem configuration results in voice quality degradation as speech is encoded and decoded, then encoded and decoded again. One reason for the degradation is that postfiltering performed at the output of the speech decoding process introduces distortions in the spectral content of the reconstructed speech as compared to the original speech. The present invention prevents the degradation due to the use of postfilters by modifying the postfiltering within the vocoders where a tandem configuration exists. A detection code is embedded within the data signal to indicate the existence of a tandem configuration. If the detection code is received at a vocoder, modified vocoding is established within the vocoders to prevent the degradation due to the postfiltering.

30 Claims, 6 Drawing Sheets

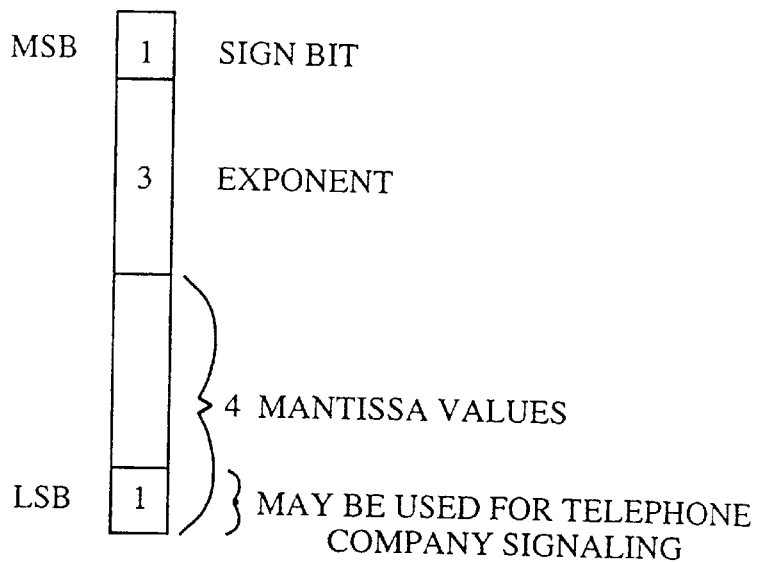
FIG. 3
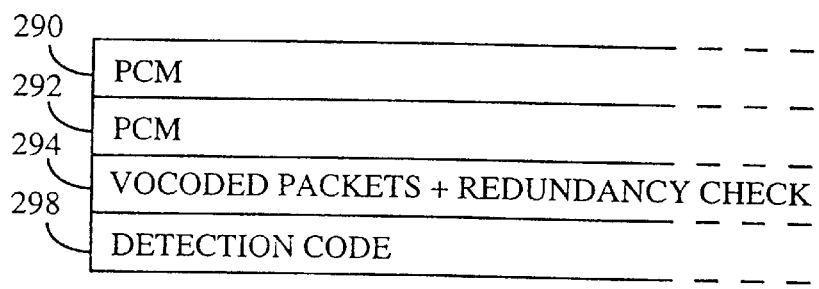
FIG. 4
| | | PACKET INACTIVE | CONFIRMATION | BYPASS MODE |
|---|---|---|---|---|
| 4 MANTISSA VALUES | MSB | PCM | PCM | PCM |
| | | PCM | 1/n₂ CONFIRM | PACKETS AND CHECK |
| | | PCM | 1/n₂ CONFIRM | PACKETS AND CHECK |
| | LSB | 1/n DETECT | 1/n DETECT | 1/n DETECT |
FIG. 9

METHOD AND APPARATUS FOR DETECTION OF TANDEM VOCODING TO MODIFY VOCODER FILTERING

This application is a continuation of application Ser. No. 08/378,300 filed on Jan. 25, 1995.

BACKGROUND OF THE INVENTION

I. Field of the Invention

The present invention relates to communication. More particularly, the present invention relates to a novel and improved method for the detection and avoidance of a serial vocoder connection.

II. Description of the Related Art

In digital communications systems, a transmitter may employ a vocoding system which efficiently encodes voice information. One method of efficient encoding uses variable data rate encoding to lower the amount of data sent during pauses or other absences of voice activity, thereby reducing the level of interference caused by this transmitter to receivers other than the intended receiver. At the receiver, a vocoding system is employed for reconstructing the voice information. In addition to voice information, non-voice information alone or a mixture of voice and nonvoice information may be transmitted to the receiver.

A vocoder which is suited for application in this environment is described in copending U.S. Pat. No. 5,414,796, entitled "VARIABLE RATE VOCODER," issued May 9, 1995, and assigned to the assignee of the present invention. This vocoder converts digital samples of the voice information to encoded data at four different rates, e.g. approximately 8,000 bits per second (bps), 4,000 bps, 2,000 bps and 1,000 bps, based on voice activity during a 20 millisecond (ms) frame. Each frame of vocoder data is formatted with overhead bits as 9,600 bps, 4,800 bps, 2,400 bps, and 1,200 bps data frames. The highest rate data frame which corresponds to a 9,600 bps frame is referred to as a "full rate" frame; a 4,800 bps data frame is referred to as a "half rate" frame; a 2,400 bps data frame is referred to as a "quarter rate" frame; and a 1,200 bps data frame is referred to as an "eighth rate" frame.

Additional details on the formatting of the vocoder data into data frames are described in U.S. Pat. No. 5,511,073, entitled "METHOD AND APPARATUS FOR THE FORMATTING OF DATA FOR TRANSMISSION," issued Apr. 23, 1996 and assigned to the assignee of the present invention. The data frames may be further processed, spread spectrum modulated and transmitted as described in U.S. Pat. No. 5,103,459, entitled "SYSTEM AND METHOD FOR GENERATING WAVEFORMS IN A CDMA CELLULAR TELEPHONE SYSTEM," issued Apr. 7, 1992, and assigned to the assignee of the present invention, the disclosure of which is incorporated by reference herein.

A system employing an efficient vocoder of the type described by the above mentioned patents provides high quality when coupled with a system which does not employ efficient vocoding such as a standard land line system. However when a vocoded system is coupled to another vocoded system such that a tandem (back-to-back) vocoder arrangement results, the voice quality is degraded over the single vocoder system case. This present invention seeks to avoid the disadvantage of tandem vocoding by detection and elimination of the arrangement.

SUMMARY OF THE INVENTION

The present invention is a method and apparatus for preventing speech degradation due to tandem vocoding operation. A typical vocoder has an encoder and a decoder portion. The encoder portion receives voice data encoded in pulse code modulated (PCM) format and provides packetized data The decoder portion receives packetized data and produces PCM output. A PCM signal is a multibit signal representing an analog voltage value corresponding to the voice signal. The packetized vocoder data format is an efficient method of encoding voice information meaning that fewer data bits can be used to represent a voice signal using the packetized format than the number of bits needed to specify the same voice signal with a PCM format.

In a typical wireless phone connection, a first user's voice is encoded in a mobile unit by a remote vocoder to produce packetized vocoder data. The packetized vocoder data is sent over a wireless connection. At a base station, a local vocoder converts the packetized data to the PCM format used on the public switch telephone network (PSTN). The PSTN conveys the PCM signal to a second end user. If the two end users that are connected each have a common type of vocoder, the resulting voice output sounds better if the tandem vocoding arrangement is avoided and the packetized data is passed directly through the PSTN avoiding conversion to PCM format. Tandem vocoding degrades the voice output because of the postfiltering performed at the speech decoding process. Postfiltering improves the perceived quality of the output speech, but also introduces distortions in the spectral content of the reconstructed speech as compared to the original speech. The present invention is a method and apparatus for detection of a tandem vocoder arrangement and preventing the degradation due to postfiltering by modifying the filtering within the vocoder.

In the preferred embodiment of the present invention, a first remote vocoder receives analog voice and produces packetized vocoder data which is transmitted over a wireless link. A first local vocoder receives the packetized vocoder data from the wireless link. The first local vocoder converts the packetized data to a multibit PCM output. The first local vocoder also adds a detection code to one of the least significant bits (LSB) of the PCM output. The first local vocoder passes the PCM signal to the PSTN. The first local vocoder also receives PCM input over the PSTN. The first local vocoder constantly monitors the least significant bit of the PCM input for a detection code indicating that a second local vocoder is connected at the receiving end. If the detection code is detected, then a modified filter mode is established. In the modified filter mode, the filtering within the first local vocoder is modified to prevent degradation of the output speech signal.

BRIEF DESCRIPTION OF THE DRAWINGS

For a more complete understanding of our invention, we now refer to the following detailed description of the embodiments illustrated in the accompanying drawings, wherein:

FIG. 3 shows a typical PCM signaling format;

FIG. 4 shows an exemplary PCM signaling format containing vocoded packets and the detection code;

FIG. 9 shows the four mantissa values for both confirmation and by pass mode.

DESCRIPTION OF THE PREFERRED EMBODIMENT

In a modern communication system that conveys voice signals, analog voice signals are digitized and sent as digital signals over a network. Examples of such modern communication systems are cellular telephone systems, personal communication systems (PCS), wireless local loop (WLL) systems, and satellite communication systems such as GLOBALSTAR. In each of these systems a connection may be established between two remote users. The present invention is applicable where two remote users are connected through one or more modern communication systems where both remote users employ similar vocoders.

Figures 1, 2:
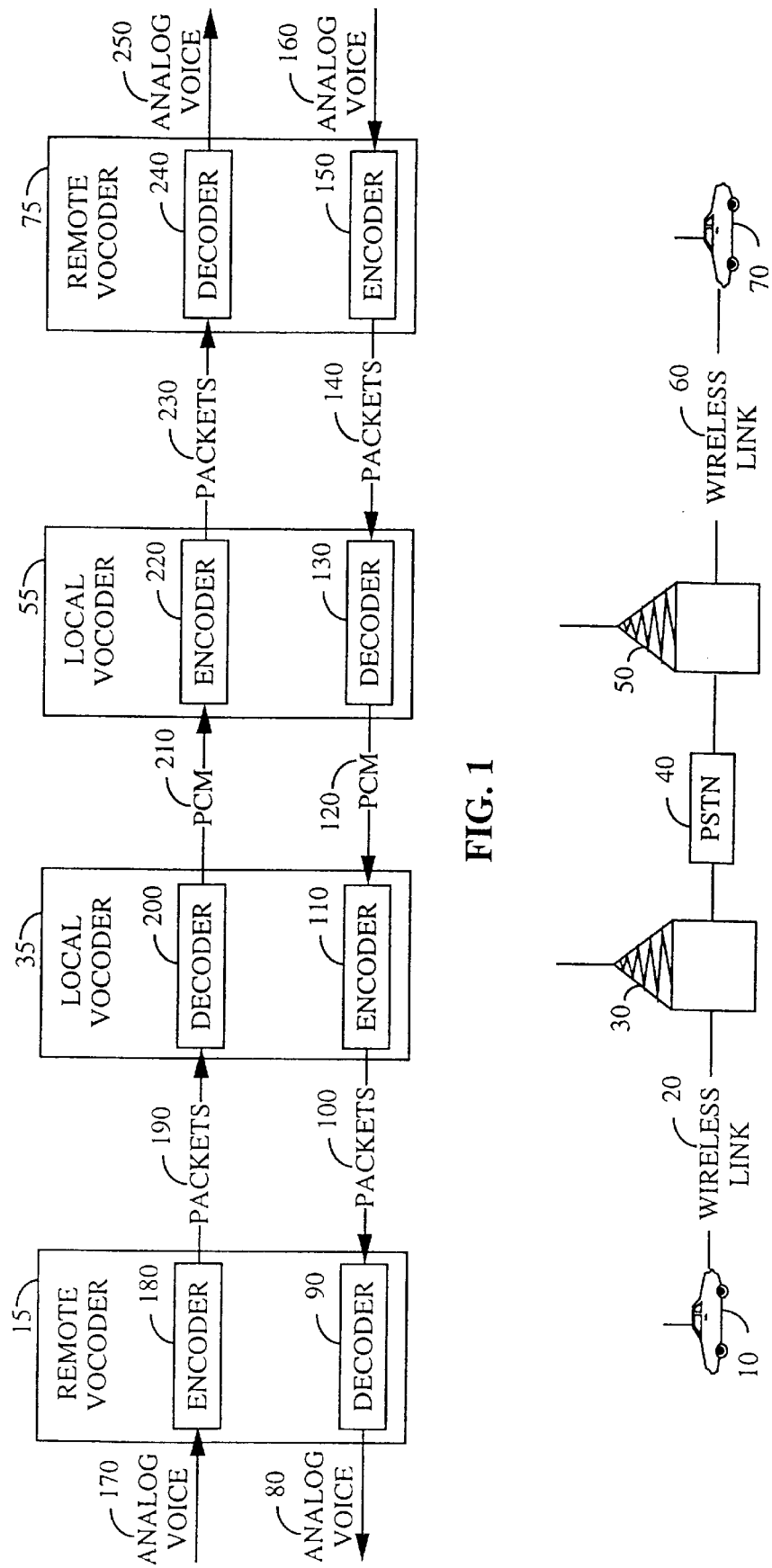
FIG. 1 illustrates the signaling between two remote system users.
FIG. 2 illustrates the connections between two remote system users.

FIG. 1 illustrates the signaling between two remote system users employing similar vocoders and FIG. 2 illustrates the connections between two remote system users employing similar vocoders. Remote unit 10 is a mobile telephone which receives analog voice 170 and produces analog voice 80. Remote unit 10 comprises remote vocoder 15 comprised of encoder 180 and decoder 90. Encoder 180 receives analog voice 170, converts it to digital form, encodes the digitized voice, and packetizes it for transmission over wireless link 20 as packets 190. Decoder 90 receives packets 100 over wireless link 20, decodes packets 100 to create digitized voice, and converts the digitized voice into analog voice signal 80. This process may be implemented in accordance with the teachings of U.S. Pat. No. 5,103,459, U.S. Pat. No. 5,511,073 U.S. Pat. No. 5,414,796 as noted above.

At base station 30, decoder 200 of local vocoder 35 receives packets 190 from wireless link 20. Decoder 200 converts the packetized data into standard pulse code modulated signal (PCM) 210 for transmission on the public switch telephone network (PSTN) 40. Encoder 110 of local vocoder 35 in base station 30 receives PCM 120 from PSTN 40 and produces packets 100 for transmission over wireless link 20.

PCM data is a multibit digital value that represents a voltage level of the corresponding analog signal. For example the most basic PCM conversion process has three steps. First the continuous analog voice signal is sampled at discrete time intervals. Then the sampled values are quantized to produce a digital value. The quantized values are then encoded into a digital representation of the quantized value.

In any sampled data system, the process of conversion to PCM introduces quantization noise. For the usual linear encoding scheme, the digitized code word is a truncated binary representation of the analog sample. The effect of this truncation is most pronounced for small signals. Speech signals have a wide dynamic range. If a linear scheme is used which has sufficient dynamic range to accommodate the largest signals, the signal to noise ratio of the smaller amplitude signals is degraded unless a large word length is used. In order to provide an acceptable signal to noise ratio for the smaller amplitude signals without an unduly large number of digital bits, linear encoding of the quantized samples is not sufficient. In standard PCM formats used over PSTN systems, an alternative to linear encoding is used such that the size of the encoding interval is proportional to the input signal level. The encoding interval is small for small amplitude signals and larger for larger signals. Consequently, smaller amplitude signals are represented with more encoding levels and, therefore, with greater resolution.

The resulting encoding scheme is approximately logarithmic in nature and has the property of yielding the greatest dynamic range for a given signal-to-noise ratio and word length. The nonlinear relationship between the code words and the samples they represent effectively compresses the number of bits necessary to encode an analog signal of a given dynamic range. The process of decoding using the analogous reverse process is referred to as expansion. Thus the term 'companding' (derived from the words compression and expansion) is used to denote the conversion between the analog samples and the logarithmic PCM value.

FIG. 3 represents an eight-bit format of PCM signal typically used in PSTN systems. The most significant bit is the sign bit which represents the sign (+/−voltage level) of the sampled value. The next three bits represent the exponent reflecting of the magnitude of the sampled value. The four least significant bits represent the actual value or mantissa value of the sampled value.

It is well known that within the four bits of mantissa value, the least most significant bit (LSB) may be partially corrupted without greatly affecting the sound quality of the resulting system. In fact phone companies typically do not guarantee the LSB will be transmitted correctly over the PSTN and reserve the right to use the LSB for inband signaling purposes. In the typical PSTN PCM format, complete corruption of the LSB can cause a 6 dB loss in signal to noise ratio for the resulting voice. If the LSB is corrupted only a portion of time, the signal to noise ratio degradation is decreased. For example, if every tenth LSB is corrupted, the degradation drops to approximately 1 dB.

FIGS. 1 and 2 illustrates the situation in which the present invention can be most useful. Note that in FIGS. 1 and 2, PSTN 40 is connecting two similar base stations each comprising a similar remote vocoder.

At base station 50, decoder 130 of local vocoder 55 receives packets 140 from wireless link 60. Decoder 130 converts packets 140 into a standard PCM 120 for transmission to PSTN 40. Encoder 220 of local vocoder 55 receives PCM 210 from PSTN 40 and produces packets 230 for transmission over wireless link 60.

Remote unit 70 is a mobile telephone which receives analog voice 160 and produces analog voice 250. Remote unit 70 comprises remote vocoder 75 comprised of encoder 150 and decoder 240. Encoder 150 receives analog voice 160, converts it to digital form, encodes the digitized voice, and packetizes the encoded data for transmission over wireless link 60 as packets 140. Decoder 240 receives packets 230 over wireless link 60, decodes the packets to create digitized voice, and converts the digitized voice into analog voice signal 250.

In the ideal situation packets 140 on wireless link 60 are identical to packet 100 on wireless link 20. But in reality the tandem vocoder arrangement of FIG. 1 and process of conversion of packets 140 to PCM 120 and the reconversion of PCM 120 to packets 100 does not yield the ideal result. In fact, voice quality at each remote unit 10 and 70 can be noticeably degraded over the single vocoder case. The present invention seeks to avoid the degradation.

Figure 5:
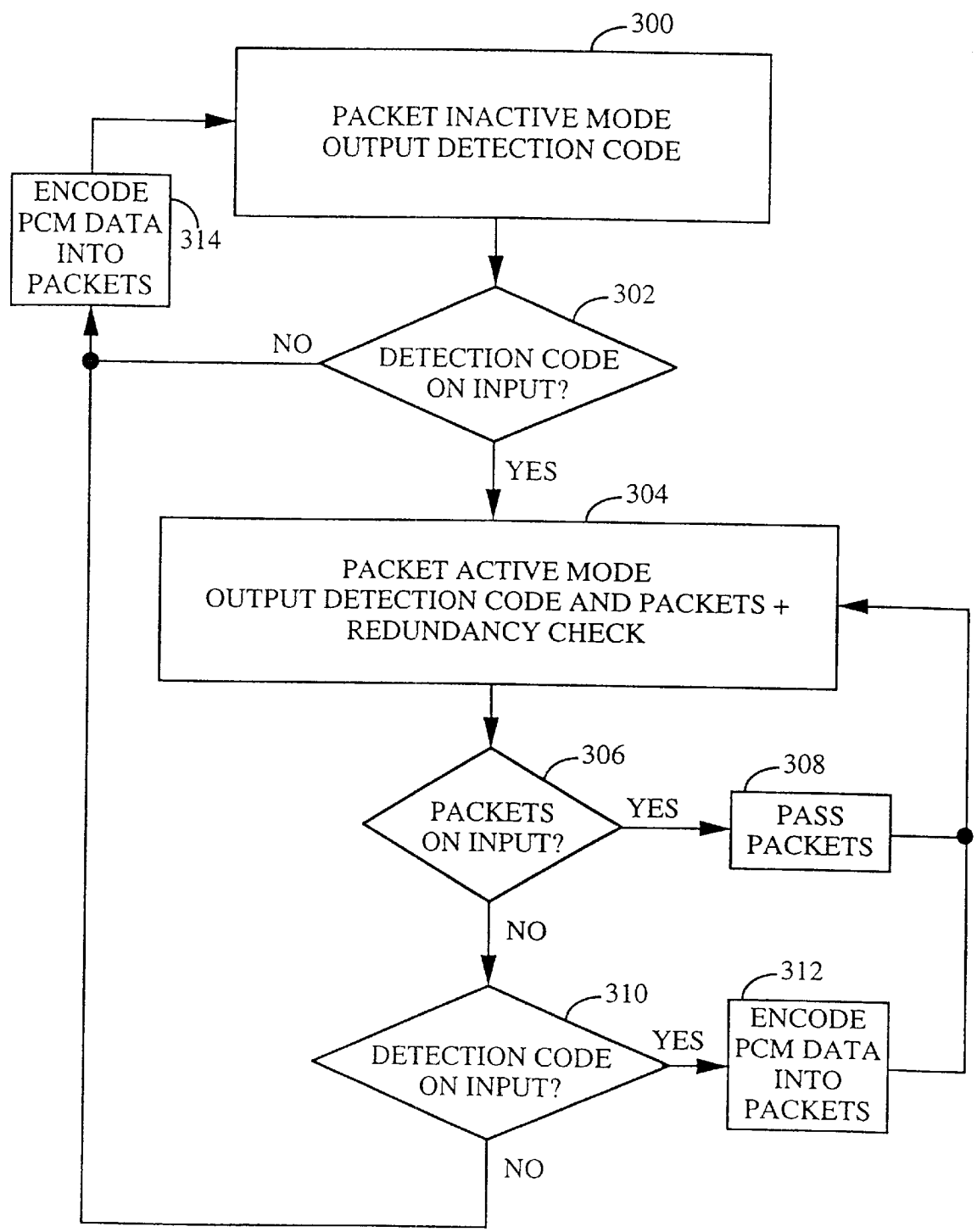
FIG. 5 is a flowchart showing the method of detection of a remote vocoder and the bypass of the PCM conversion.

FIG. 5 shows the process carried out by local vocoder 35 or 55. When a call is initiated, vocoder 35 begins to receive PCM 120 and provide packets 100 and to receive packets 190 and provide PCM 210. In addition to the conversion of packets 190 to PCM 210, decoder 200 replaces or, in the preferred embodiment, interleaves a detection code on the LSB of the mantissa value portion of the PCM data format. Because the PSTN most likely also uses the LSB for signaling, the detection scheme must work in spite of or in conjunction with inband PSTN signaling or be placed on one of the more significant bits.

A simple method of reducing the degradation of signal to noise ratio due to adding the detection code is to use a detection code which only corrupts every nth LSB. However, a periodic code which corrupts each nth LSB may beat with inband PSTN signaling and therefore be undetectable at the receiving vocoder. A preferred method of implanting the detection code on the LSB uses a pseudorandom pattern detection code that corrupts, on average, each nth LSB. In the pseudorandom pattern, the pulse locations of the detection code are varied over time. The detection process for the pseudorandom code can allow for some errors thus interference by inband PSTN signaling would not prevent the detection of the code.

Block 300 of FIG. 5 represents the initial state called packet inactive mode. Decoder 200 is producing the PCM and detection code. Encoder 110 is looking for an incoming detection code as indicated by block 302. If encoder 110 detects the detection code it signals to decoder 200 to substitute the packetized data for yet another one of the LSB's of the mantissa value of PCM 120. Decoder 200 continues to produce PCM 210 but the PCM data is truncated as shown in FIG. 4.

FIG. 4 shows the four mantissa value bits of the PCM output when packets are being passed in a first embodiment. The sign bit and the exponent digits (not shown in FIG. 4) continue to carry the PCM encoded information. Likewise MSB 290 and second most significant bit 292 of mantissa value continue to carry the PCM encoded information. Third most significant bit 294 is replaced with the vocoded packet data and some sort of redundancy check. A wide variety of redundancy checks are well known in the art which can be used to provide the code check function. LSB 298 may continue to carry the detection code at all times. Alternatively LSB 298 may be used to carry a portion of the vocoder data or the redundancy check bits in addition to or instead of the detection code.

As noted above, the packetized vocoder data is a much more efficient method of encoding voice information meaning that fewer data bits can be used to represent a voice signal using the packetized format than the number of bits needed to specify the same voice signal with a PCM format. Thus, in some cases, a single bit of the eight bit PCM code may serially carry the vocoder packets at the same rate that they are transmitted over the wireless link as well as a redundancy check. Note that if a variable rate vocoder is used, when the data rate is less than full rate only a subset of the PCM code may need to be overwritten.

Block 304 represents the state in which decoder 200 is passing the packets 190 within PCM 210 called packet active mode. Encoder 110 monitors for the redundancy check indicating that packets 140 within PCM 120 are being received as indicated by block 306 of FIG. 5. If the redundancy check is favorable, encoder 110 passes packets 140 included in PCM 120 directly as packets 100, as indicated by block 308, and essentially ignores the rest of the PCM input.

If the redundancy check fails, encoder 110 monitors for the detection code, block 310. If the detection code is still present indicating the presence of local vocoder 55, encoder 110 begins to encode the incoming PCM data into packets again, block 312, but continues to output packets and the redundancy check, block 304. If the detection code is not detected, encoder 110 begins to encode the incoming PCM data into packets again, block 314, and stops outputting packets and the redundancy check, block 300. Decoder 200 continues to produce the detection code but no longer appends packets 190 to PCM 210. Likewise encoder 110 ceases attempting to directly pass packets 140 and begins to encode PCM 120 input packets 100.

An alternative embodiment to the one shown in FIG. 5, the detection code may be added to the PCM signal only when the data rate of the system is less than full rate. For example, if the variable rate vocoder described in the above mentioned U.S. Pat. No. 5,414,796 is used, eighth rate data indicates that the user is not speaking and the vocoded packets are carrying only background noise. Therefore any perceptible degradation in the resulting signal by the addition of the detection code to the PCM during a time when eighth rate data is being communicated raises the background noise level and does not affect actual voice carrying packets. The asynchronous nature of the present invention lends itself well to the reduction of transmission of the detection code. No other changes to the present invention are required. The introduction of a reduction of transmission of the detection code may delay the system entering packet active mode but this delay will typically be on the order of 50 milliseconds.

The advantage of the packet active mode state of block 304 is that the direct correspondence of packets 100 to packets 140 provides a much higher quality sound than the standard tandem vocoding system. One advantage of this method is that each local vocoder autonomously and asynchronously enters the packet active mode. There is no need to co-ordinate an exact time at which each vocoder switches to the packet active mode or back to the packet inactive mode if necessary. Note that the substitution of two of the mantissa value data bits of the PCM signal degrades the audible signal produced by decoding it as a PCM signal but does not obliterate the signal and the resulting decoded analog voice signal is comprehensible.

Figure 8:
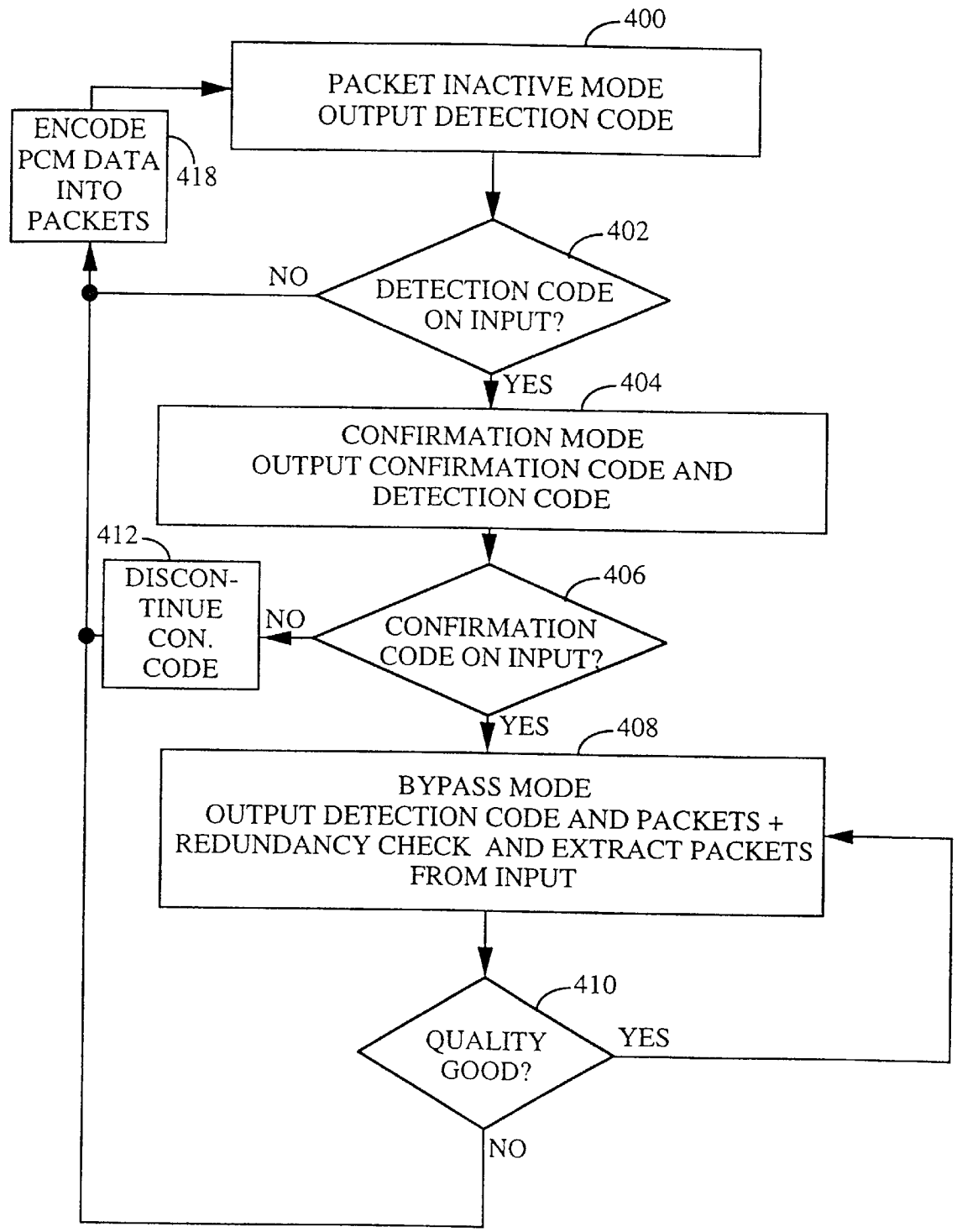
FIG. 8 shows an alternative method of detection of a remote vocoder and the bypass of the PCM conversion comprising a confirmation mode.

The first embodiment of the present invention shown in FIGS. 4 and 5 may be modified to include a intermediate, confirmation mode as shown in FIGS. 8 and 9. The confirmation mode allows the transition from PCM to packets to be more synchronized between the two vocoders and adds less signal to noise degradation to PCM operation in the process of switching to bypass mode.

FIG. 8 shows an alternative process carried out by local vocoder 35 or 55. When a call is initiated, vocoder 35 begins to receive PCM 120 and provide packets 100 and to receive packets 190 and provide PCM 210. In addition to the conversion of packets 190 to PCM 210, decoder 200 implants a pseudorandom detection code on the LSB of the mantissa value portion of the PCM data format which replaces one out of each n LSB's on average as shown in the packet inactive column of FIG. 9. In the preferred embodiment of FIGS. 8 and 9, n is large enough such that the degradation to the resulting voice is less than 1 dB typically resulting in n having a value of 8 or greater. The sign bit and the exponent digits (not shown in FIG. 9) continue to carry the PCM encoded information.

Block 400 of FIG. 8 represents the initial packet inactive mode state. Decoder 200 is producing the PCM and detection code. Encoder 110 is looking for an incoming detection code as indicated by block 402. The process of detecting the 1/n detection code can allow for some error to be received and yet still indicate that the detection code is present. If encoder 110 detects the detection code, local vocoder 35 enters confirmation mode, block 404.

In the confirmation mode state, decoder 200 continues to produce PCM 210 but the PCM data is adulterated as shown in the confirmation column of FIG. 9 in that a confirmation sequence is implanted on two higher order bits in the preferred embodiment. One advantage of the confirmation mode is that the higher order PCM bits are not used for PSTN inband signaling and a more reliable indication of compatibility of the two vocoders can be achieved before entering bypass mode. The confirmation sequence need not use every bit of the higher order digits and, in the preferred embodiment, uses only one out of each $n_2$ bits. The confirmation sequence can be a simple pattern or pseudorandom sequence. The confirmation code may contain information about the type or mode of operation of the vocoder. The confirmation sequence may contain a sample of actual vocoded voice information which could be used to verify that the two vocoders are truly compatible before the switch to bypass mode is made. The advantages of a confirmation sequence which uses one out of every $n_2$ bits is that $n_2$ can be made sufficiently large such that the signal to noise ratio degradation in confirmation mode is on the order of 13 dB in the preferred embodiment thus a false entry into confirmation mode causes less degradation to the system than false entry into bypass mode.

Confirmation mode can be used to synchronize the transition of the both vocoders into bypass mode. In the alternative embodiment of FIGS. 8 and 9, two of the higher order digits of the mantissa value are used to carry the packets and redundancy check in the bypass mode. Use of two of the higher order digits can cause a signal to noise ratio degradation on the order of 18 dB. 18 dB of signal to noise ratio degradation has significant adverse effects on the resulting voice quality. Therefore, it is advantageous to minimize the amount of time during which only one of the vocoders is in bypass mode. Confirmation mode can be used to synchronize the transition into the bypass mode such that both vocoder transitions, although independent and autonomous, occur at nearly the same time. Confirmation mode also minimizes false entries into bypass mode.

Block 404 represents the state in which decoder 200 is passing the $1/n_2$ confirmation code within PCM 210. Encoder 110 monitors for an analogous confirmation code within PCM 120 as indicated by block 406 of FIG. 8. If the confirmation code is favorably detected, the system enters the bypass mode state, as indicated by block 408. If the confirmation code fails to be detected, decoder 200 discontinues transmission of the confirmation code, block 412, and re-enters the packet inactive mode state, block 400.

Block 408 represents the bypass mode in which decoder 200 is passing the packets 190 within PCM 210 and encoder 110 is passing packets 140 included in PCM 120 directly as packets 100. Encoder 110 monitors for the quality of the received data as indicated by block 410 of FIG. 8. If the quality is favorable, the system remains in bypass mode, as indicated by blocks 408 and 410. The quality check can fail by failure of the redundancy check, a lost link, high error rate, or poor quality. If such a failure occurs, vocoder 35 exits bypass mode and re-enters packet inactive mode, as indicated by blocks, 410, 418, and 400.

Another great advantage to the autonomous and asynchronous nature of the present invention shown in FIGS. 5 and 8 is that the packet active mode is gracefully exited if a situation arises which destroys the ability to pass packets. Thus the local vocoders need not be notified that the connection may become altered. They are able to detect the change and return autonomously to packet inactive mode.

Figures 6, 7:
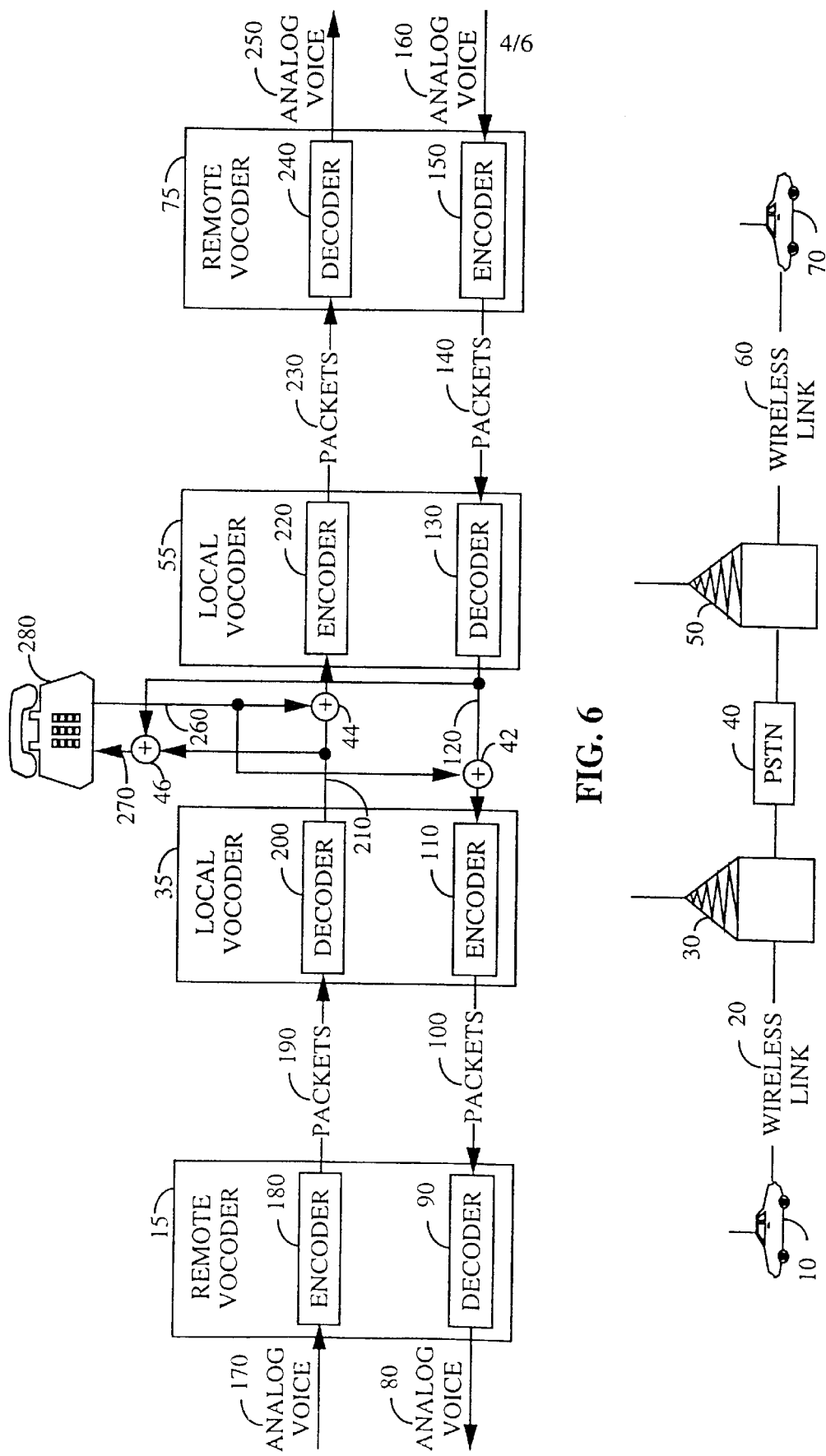
FIG. 6 illustrates the signaling between two remote system users when a third user is introduced to the connection.
FIG. 7 illustrates the connections between two remote system users when a third user is introduced to the connection.

FIGS. 6 and 7 depict the situation in which such a previous establish packet active mode is corrupted causing a need for the system to return to packet inactive mode. A third party may be added to the existing connection shown in FIGS. 1 and 2 if a conference call is initiated by one of the parties to the original call. In this case third party land line unit 280 is added to the connection. Third party unit 280 does not have a vocoder and produces standard PCM 260 and receives PCM 270 from PSTN 40. PCM 270 is the sum of PCM 120 and PCM 210 as created through summer 46. Encoder 110 receives the sum of PCM 260 and PCM 120 through summer 42. Likewise encoder 220 receives the sum of PCM 210 ad PCM 260 through summer 44. When adding two logarithmically encoded PCM signals, each of the PCM signals must first be converted back into the linear quantized digital values. The linear digital values can be added together directly and re-encoded logarithmically as a sum. This process obliterates the packets and the detection code. Even if the third party had a similar vocoder to the ones in base stations 30 and 50, the packets and detection code would still be obliterated.

In this case, the system in packet active mode (block 304 of FIG. 5) or bypass mode (block 408 of FIG. 9) begins to fail the redundancy test. Next the encoder looks for the detection code which is not present and the vocoder enters the packet inactive mode (block 300 of FIG. 5 or block 400 of FIG. 9). Even though this process takes some amount of time, third party 280 can still participate in the conversation while the process takes place. Typically only about 50 msec. are required for the each vocoder to asynchronously exit the packet active mode. The sign bit, magnitude bit, and the upper bits of mantissa value are not effected so that third party unit 280 receives a degraded signal until each local vocoder 35 and 55 has entered packet mode inactive. Likewise, a valid PCM signal is available to each local vocoder 35 and 55 as it independently and autonomously detects third party unit 280's effect on the system and begins to once again encode the PCM packets. Local vocoders 35 and 55 continue to transmit the detection code even when third party unit 280 remains on the connection. If third party unit 280 is disconnected, through process of FIGS. 5 or 9 local vocoders 35 and 55 begin to pass packets again.

One of the primary reasons that the tandem vocoders produce degraded quality audio signals is that modern vocoders use postfilters at the output of the speech decoding process. The postfilters mask out some of the quantization noise injected by the analog to digital conversion and the digital encoding process. However as the postfilter improves the perceived quality of the coded speech, it also introduces a distortion in the spectral content of the reconstructed speech as compared to the original speech. Repeating the vocoding process on the reconstructed speech results in degraded quality due to this spectral distortion. The use of a postfilter in a vocoder is described in the above mentioned U.S. Pat. No. 5,414,796.

One method to prevent the degradation due to the use of postfilters is to modify the filtering within the vocoders when two vocoders are operating in tandem. For example, referring again to FIG. 1, assume that decoder 200 has a postfilter or other filter causing similar effects. When the tandem vocoder situation is detected through the use of any one of the methods of the present invention, several courses of action may be taken. The filter within decoder 200 may be completely disabled or bypassed such that the effects of the filter are eliminated. Alternatively the filter within decoder 200 may be modified such as by making the frequency response of the filter more gentle. In yet another embodiment, an inverse filter may be added to encoder 220 to compensate for the effects of the postfilter.

Figure 10:
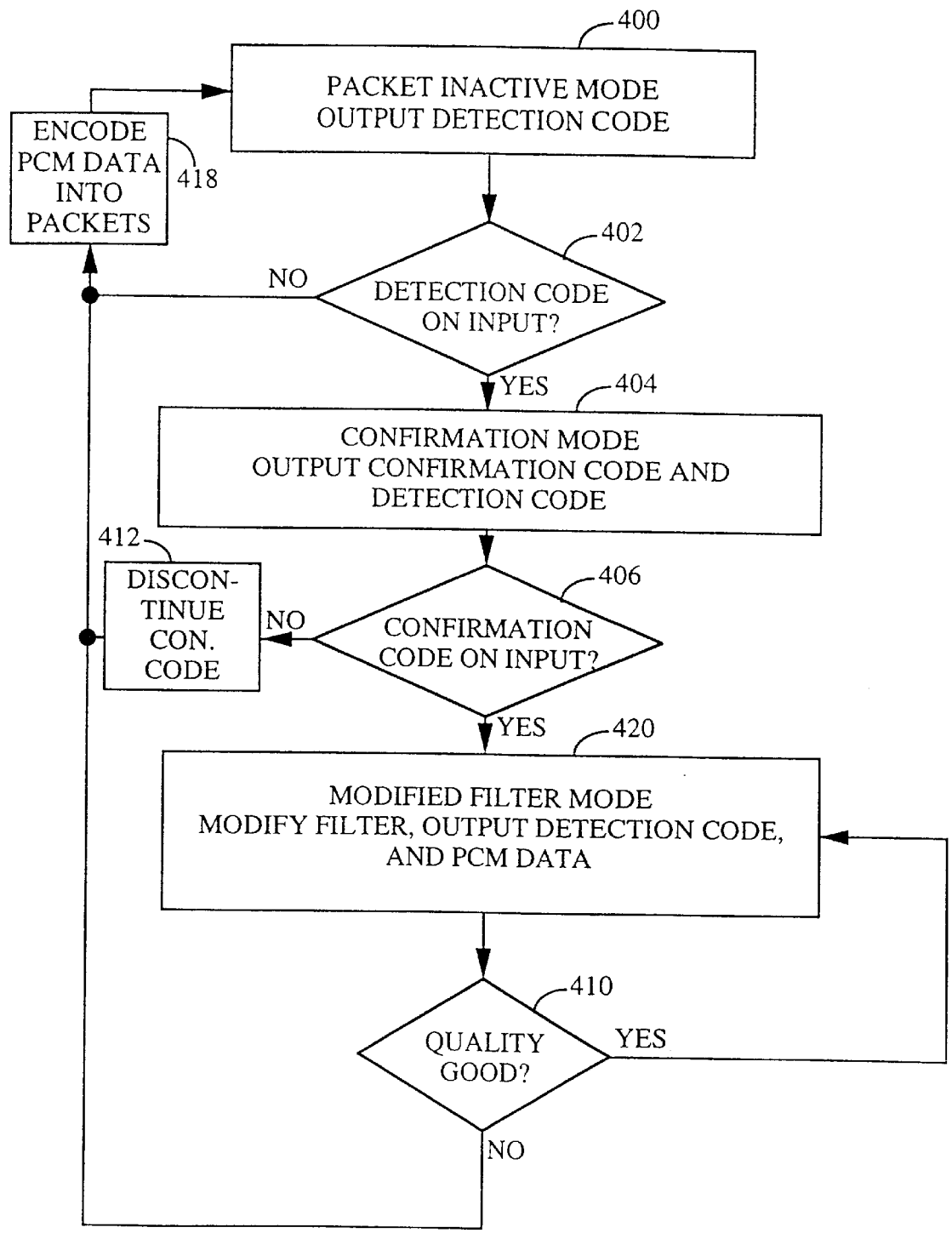
FIG. 10 shows an method of detection of a remote vocoder and offering improvement while continuing to output PCM packets.

FIG. 10 shows one embodiment of vocoder detection incorporating the disabling of a filter within a vocoder. The embodiment of FIG. 10 is based on the operations described above in conjunction with FIG. 8. Like reference numbers are used in FIG. 10 to correspond to like operation in FIG. 8. Note that the difference between FIG. 10 and FIG. 8 is the substitution of modified filter mode state, as indicated by block 420, for bypass mode state, as indicated by block 408.

In the modified filter mode state, the system continues to pass PCM encoded data rather than pass packets. Referring again to FIG. 9, in the modified filter mode the four mantissa values have the same configuration as the packet inactive mode. The difference lies in the fact that the filtering within at least one of the vocoders has been changed.

Stepping through FIG. 10, beginning with block 404, block 404 represents the state in which decoder 200 is passing the $1/n_2$ confirmation code within PCM 210 just as in FIG. 8. Encoder 110 monitors for an analogous confirmation code within PCM 120 as indicated by block 406 of FIG. 10. If the confirmation code is favorably detected, the system enters the modified filter mode state, as indicated by block 420. If the confirmation code fails to be detected, decoder 200 discontinues transmission of the confirmation code, block 412, and re-enters the packet inactive mode state, block 400.

Block 420 represents the modified filter mode in which, for example, decoder 200 has modified its postfilter and is passing the resulting PCM data and detection code within PCM 210. Encoder 110 monitors the quality of the received data as indicated by block 410 of FIG. 10. If the quality is favorable, the system remains in modified filter mode, as indicated by blocks 420 and 410. The quality check can fail by failure of the detection code, a lost link, high error rate, or poor quality. If such a failure occurs, vocoder 35 exits modified filter mode and re-enters packet inactive mode, as indicated by blocks, 410, 418, and 400.

The embodiment of FIG. 10 has several advantages. One advantage is that the difference between the PCM encoded data in the packet inactive mode and the PCM encoded data in the modified filter mode is much less than the difference between the PCM encoded data in packet inactive mode and the bypass mode. Therefore the modified filter mode state is much less likely to cause noticeable audible effects if the state is erroneously entered or during transitions between states.

Also note that the modified filter mode may be used even if two different types of vocoders are connected. Even if the method used to encode the voice signals is different in the two tandem vocoders, each of the tandem vocoders is likely to have a postfilter or other filter which induces spectral distortions. In any case, the audio quality can be improved by eliminating the effects of the filter. In this case one of the codes transmitted from the vocoder may indicate the presence of a filter having an effect which should be modified if operating in tandem with another vocoder.

The modified filter state could be combined quite readily with other embodiments of the present invention. For example, the modified filter mode state could be substituted for block 312 of FIG. 5. The modified filter state could also be used as a transition state between the other states such as between the packet inactive state and the confirmation state or the confirmation state and the bypass state.

A myriad of variation to the present invention are readily apparent to one skilled in the art. For example, the simple rearrangement of which bits of the mantissa value are used to accommodate the detection code and data packets.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for providing efficiently vocoded data over a pulse code modulated (PCM) system comprised of at least a first vocoder and a PCM communication link, comprising the steps of:

encoding at said first vocoder efficient vocoder data from a first remote source into a first PCM encoded signal for transmission over said PCM communications link wherein said step of encoding comprises the step of filtering in a first manner;

including in said first PCM encoded signal a transmitted detection code;

receiving at said first vocoder a second PCM encoded signal over said PCM communications link;

encoding at said first vocoder said second PCM encoded signal to produce efficient vocoder data for transmission to said first remote source wherein said step of encoding comprises the step of filtering in a second manner;

monitoring at said first vocoder said second PCM encoded signal to discern whether said second PCM encoded signal comprises a received detection code; and modifying said first or said second manner of filtering if said second PCM encoded signal comprises said received detection code.

2. The method of claim 1 for providing efficiently vocoded data over said PCM system wherein said first efficient vocoder data has a plurality of data rates comprising a full rate and at least one lower data rate.

3. The method of claim 2 for providing efficiently vocoded data over said PCM system wherein said step of including in said first PCM encoded signal said transmitted detection code is conditioned upon said first efficient vocoder data having a data rate less than said full rate.

4. The method of claim 1 for providing efficiently vocoded data over said PCM system wherein said PCM system comprises a plurality of classes of vocoders and wherein said transmitted detection code is indicative of said first manner of filtering at said first vocoder.

5. The method of claim 1 for providing efficiently vocoded data over said PCM system wherein said first PCM encoded signal comprises logarithmically encoded values and wherein said logarithmically encoded values comprise a plurality of bits which designate an order of magnitude and a plurality of bits which designate a mantissa and wherein said transmitted detection code is inserted onto a least significant bit of said plurality of bits which designate said mantissa.

6. The method of claim 5 for providing efficiently vocoded data over said PCM system wherein said PCM system comprises a system controller which may corrupt said least significant bit of said plurality of bits which designate said mantissa and wherein said transmitted detection code operates in conjunction with said corruption by said system controller.

7. The method of claim 5 for providing efficiently vocoded data over said PCM system wherein said efficient vocoder data is inserted on a second least significant bit of said plurality of bits which designate said mantissa.

8. The method of claim 5 for providing efficiently vocoded data over said PCM system wherein said efficient vocoder data is inserted on a second least significant bit of said plurality of bits which designate said mantissa and said least significant bit of said plurality of bits which designate said mantissa.

9. The method of claim 1 for providing efficiently vocoded data over said PCM system further comprising the steps of:

continuing to monitor at said first vocoder said second PCM encoded signal to discern whether said second PCM encoded signal comprises said received detection code; and filtering in said first and filtering in said second manner if said second PCM encoded signal does not comprise said received detection code.

10. A system for providing high quality encoded voice signals over a public telephone system comprising:

a first remote vocoder for receiving a first sampled voice signal, encoding said first sampled voice signal to produce a first efficient data signal, and transmitting a first wireless link signal comprising said first efficient data signal, and for receiving a second wireless link signal comprising a copy of a second efficient data signal and decoding said second efficient data signal to produce a second sampled voice signal;

a first wireless link for conveying said first and second wireless link signals;

a first local vocoder for receiving said first wireless link signal from said first wireless link, and encoding and filtering a first PCM encoded signal in response to said first efficient data signal using a first filter, and for receiving a second PCM encoded signal, and encoding and filtering said second PCM encoded signal into said copy of said second efficient data signal using a second filter and providing said second wireless link signal comprising said copy of said second efficient data signal to said first wireless link;

a public switch telephone network for conveying said first and said second PCM encoded signals;

a second local vocoder for receiving said first PCM encoded signal from said public switch telephone network, encoding and filtering said first PCM encoded signal into a copy of said first efficient data signal using a third filter, and transmitting a third wireless link signal comprising said copy said first efficient data signal, and for receiving a fourth wireless link signal comprising said second efficient data signal, encoding said second PCM encoded signal in response to said second efficient data signal, and transmitting said second PCM encoded signal;

a second wireless link for conveying said third and said fourth wireless link signals; and a second remote vocoder for receiving said third wireless link signal from said second wireless link and decoding said copy of said first efficient data signal to produce a third sampled voice signal, and for receiving a fourth sampled voice signal, encoding said fourth sampled voice signal to produce said second efficient data signal, and transmitting said fourth wireless link signal comprising said second efficient data signal on said second wireless link;

wherein said first local vocoder is further for passing an outgoing detection code directly within said first PCM encoded signal and monitoring for an incoming detection code and wherein if said incoming detection code is detected, a response of said first filter is changed.

11. A system for providing high quality encoded voice signals over a public telephone system comprising:

a first remote vocoder for receiving a first sampled voice signal, encoding said first sampled voice signal to produce a first efficient data signal, and transmitting a first wireless link signal comprising said first efficient data signal, and for receiving a second wireless link signal comprising a copy of a second efficient data signal and decoding said second efficient data signal to produce a second sampled voice signal;

a first wireless link for conveying said first and said second wireless link signals;

a first local vocoder for receiving said first wireless link signal from said first wireless link, and encoding and filtering a first PCM encoded signal in response to said first efficient data signal using a first filter, and for receiving a second PCM encoded signal, and encoding and filtering said second PCM encoded signal into said copy of said second efficient data signal using a second filter and providing said second wireless link signal comprising said copy of said second efficient data signal to said first wireless link;

a public switch telephone network for conveying said first and said second PCM encoded signals;

a second local vocoder for receiving said first PCM encoded signal from said public switch telephone network, encoding and filtering said first PCM encoded signal into a copy of said first efficient data signal using a third filter, and transmitting a third wireless link signal comprising said copy said first efficient data signal, and for receiving a fourth wireless link signal comprising said second efficient data signal, encoding said second PCM encoded signal in response to said second efficient data signal, and transmitting said second PCM encoded signal;

a second wireless link for conveying said third and said fourth wireless link signals; and a second remote vocoder for receiving said third wireless link signal from said second wireless link and decoding said copy of said first efficient data signal to produce a third sampled voice signal, and for receiving a fourth sampled voice signal, encoding said fourth sampled voice signal to produce said second efficient data signal, and transmitting said fourth wireless link signal comprising said second efficient data signal on said second wireless link;

wherein said first local vocoder is further for passing an outgoing detection code directly within said first PCM encoded signal and monitoring for an incoming detection code and wherein if said incoming detection code is detected, a response of said second filter is changed.

12. A method of communicating digital data over a pulse code modulated (PCM) system comprising the steps of:

decoding and filtering an incoming digital signal to produce an outgoing PCM signal;

encoding an incoming PCM signal to produce an outgoing digital signal;

implanting within said outgoing PCM signal an outgoing detection signal;

monitoring said incoming PCM signal to determine if said incoming PCM signal comprises an incoming detection code;

implanting on said outgoing PCM signal an outgoing confirmation signal if said incoming PCM signal comprises said incoming detection signal;

monitoring said incoming PCM signal to determine if said incoming PCM signal comprises an incoming confirmation signal; and modifying said step of filtering if said incoming PCM signal comprises said incoming confirmation code.

13. The method of communicating digital data over a PCM system of claim 12 further comprising the steps of:

monitoring said outgoing digital signal to produce a quality index; and ceasing to modify said step of filtering if said quality index falls below a predetermined value.

14. The method of communicating digital data over a PCM system of claim 12 wherein said outgoing detection code is implanted on a least significant bit (LSB) of a mantissa value in said outgoing PCM signal.

15. The method of communicating digital data over a PCM system of claim 12 wherein said outgoing detection code has a pseudorandom pattern replacing on average one out of each n bits of a least significant bit of said outgoing PCM signal and wherein said step of monitoring said incoming PCM signal to determine if said incoming PCM signal comprises said incoming detection code is tolerant of some errors.

16. The method of communicating digital data over a PCM system of claim 12 wherein said incoming digital signal is implanted on two higher order bits of a mantissa value in said outgoing PCM signal.

17. The method of communicating digital data over a PCM system of claim 12 wherein said outgoing confirmation signal is implanted on two higher order bits of a mantissa value in said outgoing PCM signal and wherein said outgoing confirmation signal has a pseudorandom pattern replacing on average one out of each n bits.

18. A method for filter modification to reduce distortion in a communications link comprising the steps of:

filtering a first data signal using a first response;

monitoring said first data signal to discern whether said first data signal comprises a detection code; and filtering said first data signal using a modified response if said first data signal comprises said detection code.

19. The method of claim 18 wherein said first data signal is a pulse code modulated (PCM) signal.

20. The method of claim 18 wherein said first data signal is a multibit signal and said detection code is embedded on one out of each n bits of a least significant bit of said first data signal.

21. The method of claim 18 wherein said modified response has a more gentle frequency response than said first response.

22. The method of claim 18 further comprising the steps of:

encoding a variable rate signal to create said first data signal wherein said variable rate signal comprises a series of frames wherein each frame is either at a full rate or a lower rate; and embedding on said first data signal said detection code when a current frame of said variable rate signal is at said lower rate.

23. The method of claim 22 further comprising the steps of filtering said variable rate signal using a third response and wherein said modified response is an inverse of said third response.

24. A method for reduction of distortion in a communications link comprising the steps of:

filtering a first data signal;

monitoring said first data signal to discern whether said first data signal comprises a detection code; and ceasing to filter said first data signal if said first data signal comprises said detection code.

25. A system for filter modification to reduce distortion in a communications link comprising:

means for filtering a first data signal using a first response;

means for monitoring said first data signal to discern whether said first data signal comprises a detection code; and means for filtering said first data signal using a second response if said first data signal comprises said detection code.

26. The system of claim 25 wherein said first data signal is a pulse code modulated (PCM) signal.

27. The system of claim 25 wherein said first data signal is a multibit signal and said detection code is embedded on one out of each n bits of a least significant bit of said first data signal.

28. The system of claim 25 further comprising:

means for encoding a variable rate signal to create said first data signal wherein said variable rate signal comprises a series of frames wherein each frame is either at a full rate and a lower rate; and means for embedding on said first data signal said detection code when a current frame of said variable rate signal is at said lower rate.

29. The system of claim 28 further comprising means for filtering said variable rate signal with a third response and wherein said second response is an inverse of said third response.

30. The system of claim 25 wherein said second response is a more gentle frequency response than said first response.

* * * * *